3,364,729
Patented Jan. 23, 1968

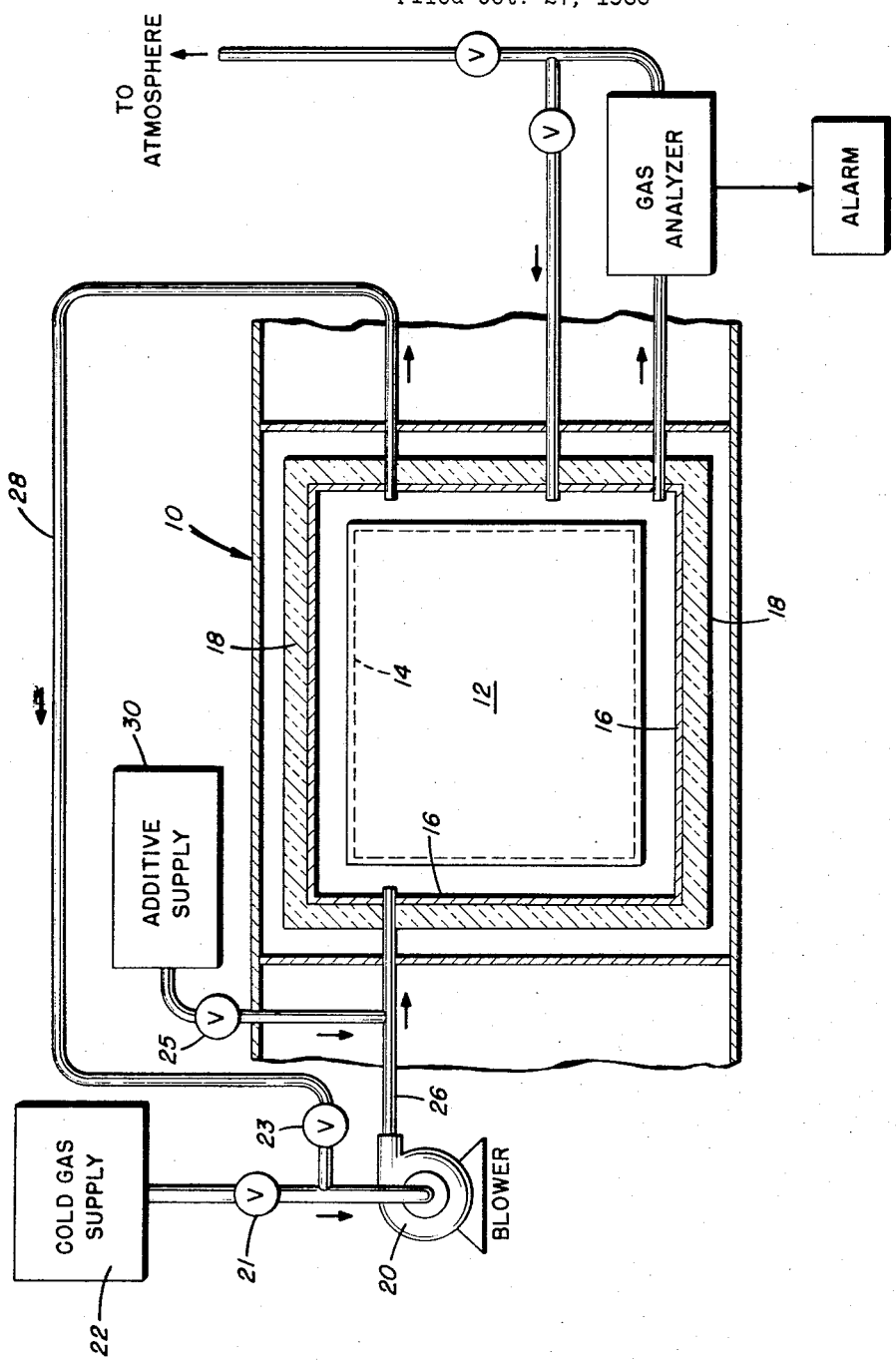

3,364,729
LEAK DETECTION SYSTEM AND METHOD FOR COLD LIQUID STORAGE TANKS
Donald R. Yearwood, Parlin, N.J., assignor to John J. McMullen, Montclair, N.J.
Filed Oct. 27, 1966, Ser. No. 589,916
7 Claims. (Cl. 73—40.7)

The present invention relates to the transportation or storage of liquefied gases particularly in ships and more specifically to a system for detecting leaks in the storage tank primary barrier.

Because of the volatile nature of liquefied petroleum gases and the extremely low temperature thereof (−160° C. in the case of methane at atmospheric pressure), early leak detection is a critical factor in ships' safety. With free standing double walled tanks such as the type disclosed in U.S. patent application Ser. No. 440,081, filed Mar. 16, 1965, the outer tank is filled with a cold gas conventionally an inert, such as nitrogen or the like. If the inner tank develops a leak, cargo gas (and possibly liquid) enters the outer tank where it can be detected by a gas analyzer by virtue of its "contaminating" the inert.

Although nitrogen can be cheaply extracted from air, it is generally known that it is particularly expensive to accomplish aboard ship due to space requirements of a plant. In addition, added expense is incurred in reducing its temperature to about −250° F. so that it can be fed to the outer tank as described. To avoid this expense, a new technique has been developed of drawing off gas from the liquefied cargo before the cargo is loaded and filling the outer tank with the already cold cargo type gas. Thus, an oxygen free atmosphere exists in the outer tank which may prevent an explosion in case the inner tank leaks. See U.S. patent application Ser. No. 529,135, filed Feb. 21, 1966. A leak detection system has been proposed for immediately detecting cargo type gas leaks in the outer tank wall. But with this arrangement, if gas leaks develop in the inner tank wall, there will be no contamination in the outer tank space and a gas analyzer cannot distinguish the presence of cargo gas from the normal atmosphere in the outer tank.

Briefly stated, the system of the present invention includes feeding into the outer tank a gas additive which is different from the cargo type gas atmosphere in the outer tank. The outer tank atmosphere is circulated until the gas mixture is uniform throughout. By using a gas analyzer, the additive-to-background gas ratio [parts per million (p.p.m.)] is determined. In the event the inner tank leaks cargo gas, the analyzer indicates an additive or background p.p.m. change and energizes an appropriate alarm.

It is therefore an object of the present invention to provide a system which permits detection of a leak condition of the inner tank wall with the use of a conventional gas analyzer when an atmosphere containing cargo type gas exists in the outer tank.

Other and further objects of the present invention will become apparent with the following detailed description when taken in view of the appended drawing in which the only figure is a diagrammatic illustration of the system according to the present invention.

With reference to the figure, a ship 10 is fitted with several (only one being shown) liquefied gas storage tanks 12 of aluminum or nickel-steel or stainless steel double wall construction including an inner wall 14 and outer wall 16 which is preferably blanketed with layers of thermal insulation 18 spaced from the carbon steel ship supporting structure. Inner tank 14 houses the cold liquid cargo which partially fills the same. An atmosphere of cargo gas (boil-off) fills the remainder of the inner tank. In the case of methane, the inner tank temperature is −160° C. and the gas pressure therein is slightly higher than the gas pressure in the outer tank so that leaking gas always moves toward the outside.

According to the invention, a blower 20 draws from a source of cold cargo gas 22 and has its output 26 feeding into the outer tank space through an appropriate array of pipes (not shown). A return line 28 recirculates gases from the outer tank back to the blower input. Line 28 is also fed from an array of pipes not shown. A gas additive source 30 is connected to feed into blower output line 26 which delivers the same to the outer tank. Source 30 could be a limited supply of bottled gas or the like.

At some time during or after the tank is cooled and filled with cargo and outer tank is purged with cold cargo gas (see U.S. patent application Ser. No. 529,135, filed Feb. 21, 1966), valve 21 is closed, valves 23 and 25 are opened and blower 20 energized. This action circulates the outer tank space atmosphere and mixes it with the additive gas. Recirculation continues until the mixture is uniform at which time valves 23 and 25 are closed to seal the outer tank and blower 20 is shut off. The tank can now be used normally until its next yearly inspection and maintenance check. Because of the sensitivity of commercially available gas analyzers, the additive-to-cargo gas ratio may be quite small, for example, below 5 percent.

A conventional gas analyzer is provided with the system and with its own pump draws the atmosphere from several locations within the outer tank, detects the additive p.p.m. and returns the sampled gas back to the outer tank or to the atmosphere since the consumption of the analyzer is low. The analyzer may be of any suitable type such as the infra red or catalytic combustion.

The additive should be inert to the background gas and have a condensation point well below that of normal pressure and temperature in the outer tank space. Typical additives for various cargo gases could be:

(1) Nitrogen
(2) Freon
(3) Mercaptan
(4) Nitrogen Oxide

As an alternative, it is contemplated that a gas mixture including cold cargo type gas may form the atmosphere in the outer tank to which the additive gas is fed. Thus, for example, source 22 may initially feed in a methane-nitrogen mixture (for liquefied methane transport) and the additive may consist of Freon gas. The system then operates the same as described with the analyzer set to detect the additive p.p.m.

Other and further modifications can be made to the herein disclosed examples of the present invention without departing from the spirit and scope thereof. For example, the additive may be mixed with pure cargo type gas at a location before the blower instead of at the blower output.

What is claimed is:

1. A system for detecting leaks in the primary barrier of a double wall liquefied gas storage tank wherein the inner and outer walls define a closed space and the liquefied gas is housed in the inner barrier at about ambient pressure, the system comprising a supply of cold gas which includes at least in part a gas of the same type as the liquid to be stored, first means to deliver the cold gas to said closed space, a supply of additive gas having condensation and sublimation temperatures below the temperature of the liquefied gas in the inner tank, second means to deliver a fixed amount of additive gas to said closed space, blower means to circulate the gas mixture in said closed space so as to make the mixture uniform throughout, and gas analyzer means to sample a part of the mixture in said space and detect the additive partsper-million and to actuate an indicating means in response to sensing an additive parts-per-million decrease.

2. A system as set forth in claim 1 wherein said blower means has an input line and an outlet line feeding said closed space, a valved recirculation line arranged to draw from said closed space and deliver to said input line, said first means including a valved line connecting the supply of cold gas to said input line.

3. A system as set forth in claim 2 wherein said second means includes a valved line connecting said additive supply to said outlet line.

4. A system as set forth in claim 2 wherein said gas analyzer discharges the sampled gas mixture to one of the atmospheres and said closed space.

5. A system as set forth in claim 1 wherein the additive gas-to-cold gas ratio in said space with a no leak condition at the inner tank wall is less than five percent.

6. A system as set forth in claim 1 wherein the cargo type gas is methane and the additive gas is nitrogen.

7. A method of detecting leaks in the primary barrier of a double wall liquefied gas storage tank wherein the inner and outer walls define a closed space and the liquefied gas is housed in the inner barrier at about ambient pressure, the method comprising supplying a cold gas to said space which cold gas includes at least in part gas of the same type as the liquefied gas to be stored, supplying an additive gas to the cold gas and mixing the gas mixture within said space so as to form a uniform mixture, said additive gas having a condensation and sublimation temperature lower than the temperature of the liquefied gas, after the mixture is uniform and constant sampling a part of the mixture and detecting the additive gas parts-per-million and actuating an indicating means in response to an additive parts-per-million decrease.

References Cited
UNITED STATES PATENTS

| | | | |
|---|---|---|---|
| 1,933,791 | 11/1933 | Couch | 73—40.7 XR |
| 3,177,704 | 4/1965 | Stange | 73—49.3 |
| 3,214,963 | 11/1965 | Schlumberger et al. | 73—49.2 |

LOUIS R. PRINCE, *Primary Examiner.*

J. NOLTON, *Assistant Examiner.*